Dec. 28, 1937.  E. W. BLANCHARD  2,103,658
VALVE GEAR FOR THREE-CYLINDER LOCOMOTIVES
Filed Nov. 14, 1936  4 Sheets-Sheet 4
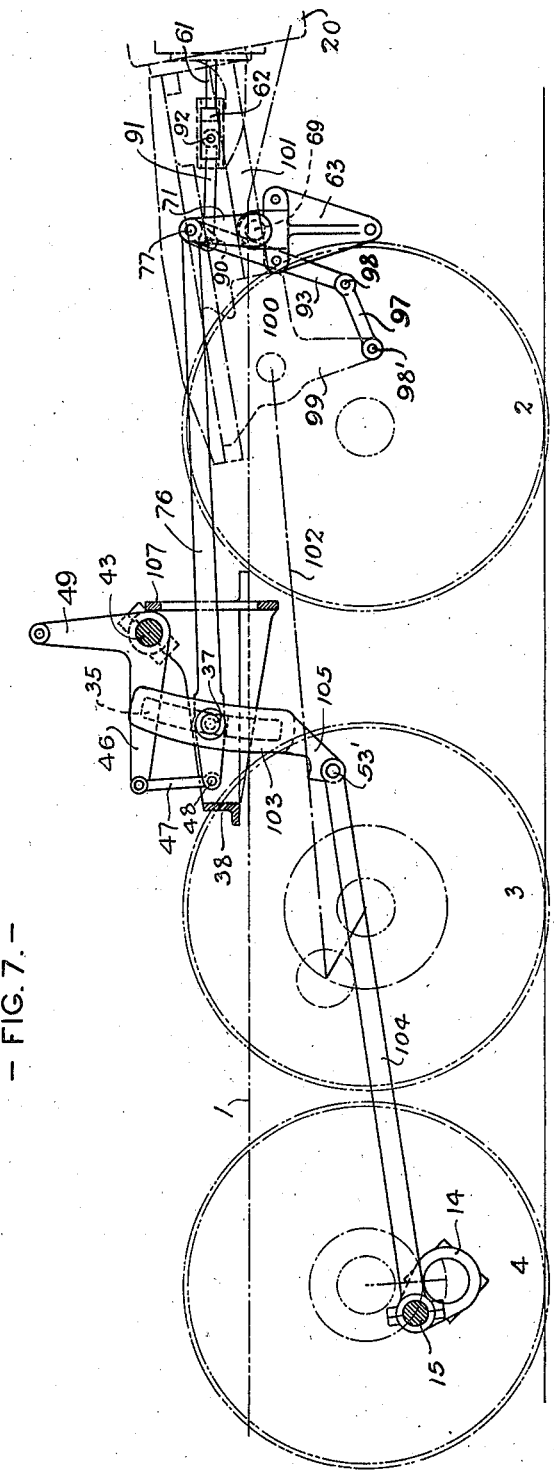
- FIG. 7. -
INVENTOR
Everett W. Blanchard
BY
S. C. Yeaton
ATTORNEY Patented Dec. 28, 1937

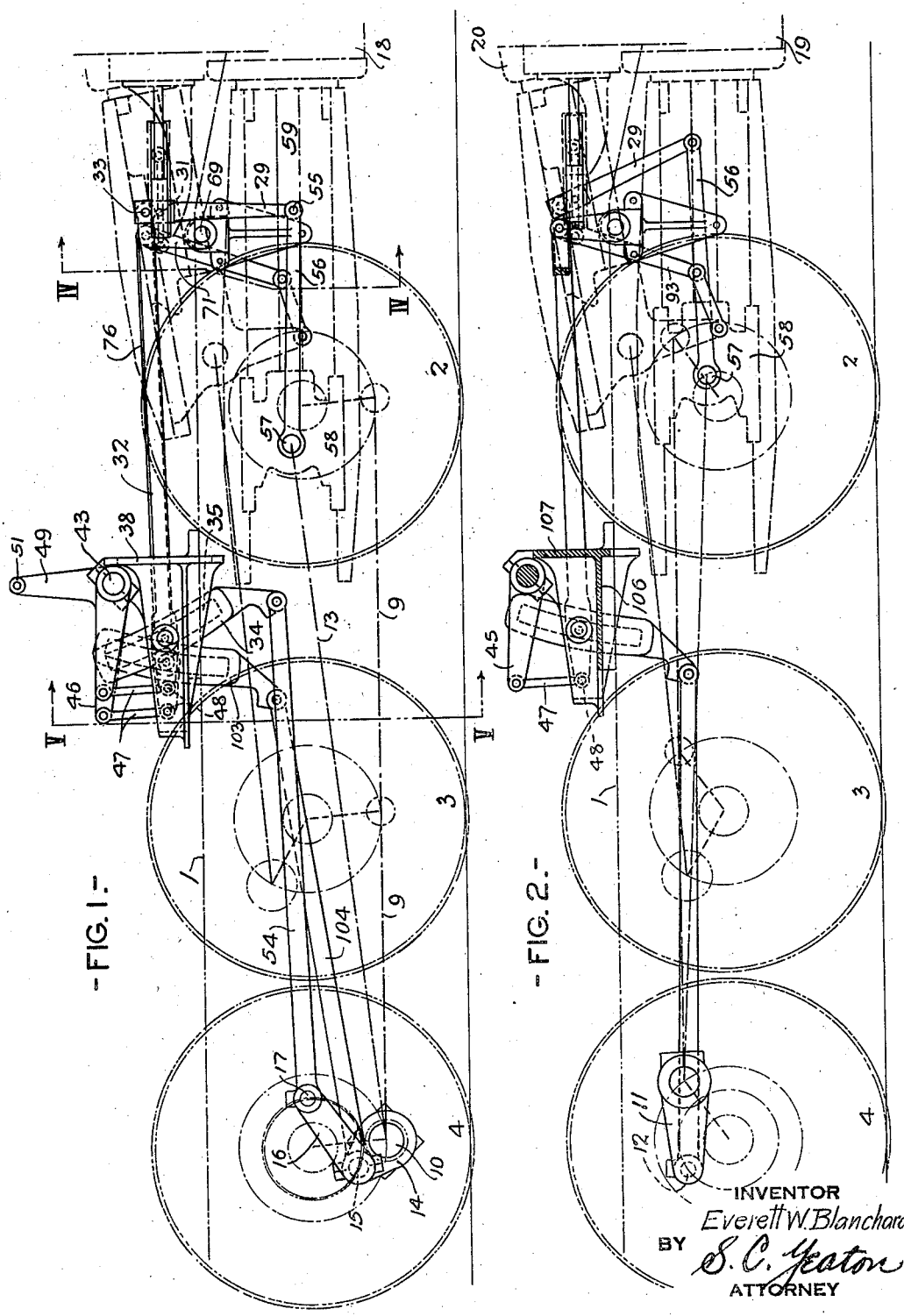

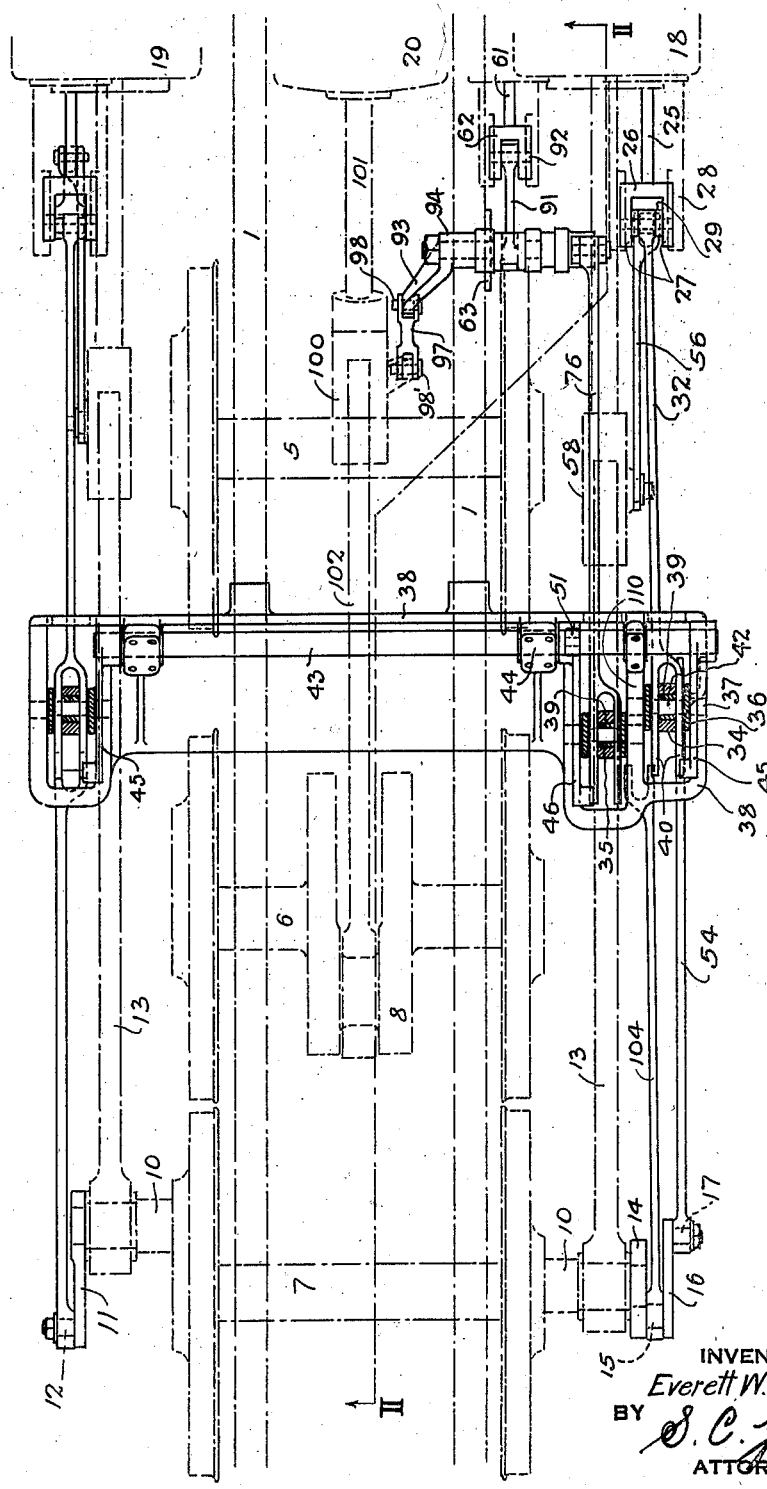

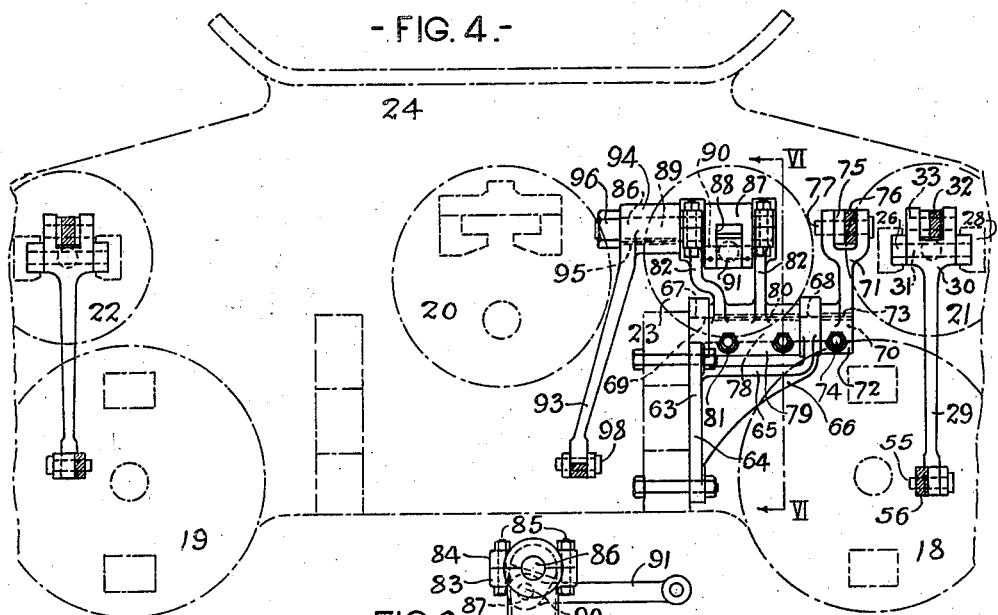
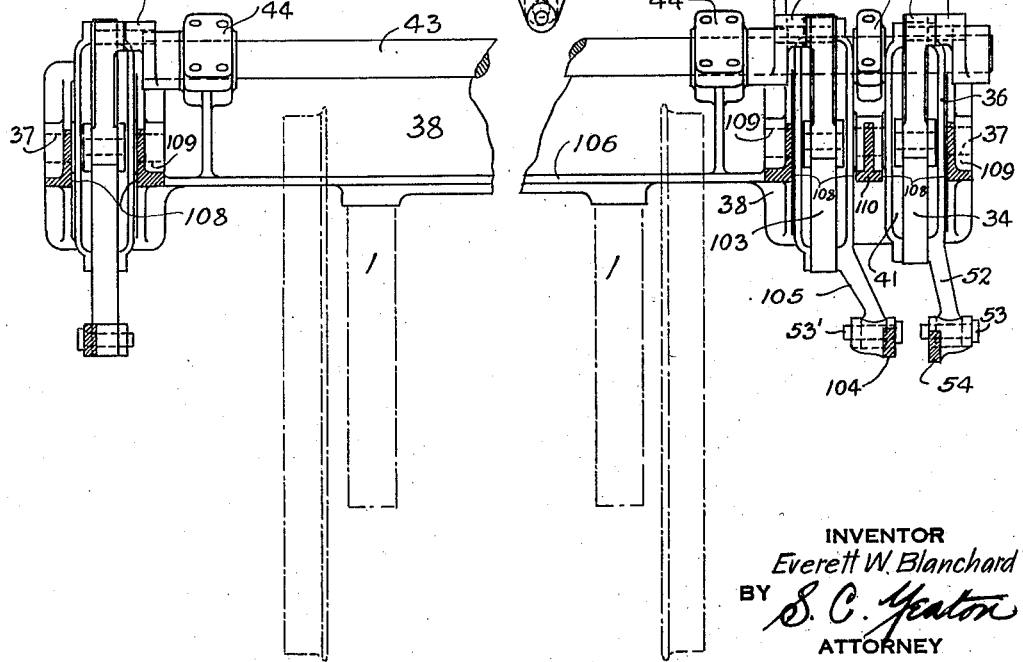

2,103,658

UNITED STATES PATENT OFFICE 2,103,658

VALVE GEAR FOR THREE-CYLINDER LOCOMOTIVES

Everett W. Blanchard, Schenectady, N. Y., assignor to American Locomotive Company, New York, N. Y., a corporation of New York Application November 14, 1936, Serial No. 110,845

5 Claims. (Cl. 121—116)

The invention relates more particularly to valve gears for three cylinder locomotives wherein the valve gear for the middle cylinder is independent of the valve gears for the outside cylinders.

While the invention is of broader application, it is however, in the present instance, shown as a preferred embodiment exemplified with a Walschaert type of valve gear wherein each of the three gears has its separate reversing link, and an object of the preferred embodiment is to provide an improved arrangement and construction of the three links and associated parts.

A further object, viewing the invention from a broader aspect, is to provide improved mechanism for operatively connecting the valve stem of the distribution valve of the middle cylinder with the crosshead of the cylinder and with the radius bar or an equivalent member of the gear.

A further object, viewing the invention from an aspect of broader application, is to provide improved mechanism, said mechanism comprising a rocker for facilitating the operation of the valve of the middle cylinder in part from one of the driving wheels of the locomotive, and serving as a combination lever of the gear for the distribution valve of the middle cylinder of a locomotive.

In the accompanying drawings forming a part of this application, wherein like references indicate similar parts throughout, Figure 1 is a diagrammatic side elevation of sufficient of a locomotive to illustrate the present invention, the view showing the valve gears of the right side and middle cylinders; Fig. 2 is a sectional side elevation taken on the line II—II of Fig. 3; Fig. 3 is a plan of the portion of the locomotive shown in Fig. 1; Fig. 4 is an enlarged transverse sectional view on the line IV—IV of Fig. 1; Fig. 5 is an enlarged broken transverse sectional view on the line V—V of Fig. 1; Fig. 6 is a sectional view taken on the line VI—VI of Fig. 4; and Fig. 7 is a side elevation showing the valve gear for the middle cylinder.

The valve gears of the present invention, as previously stated, are for operating the valves of a three cylinder locomotive. The locomotive, which is of a conventional type, comprises side frames 1, driving wheels 2, 3 and 4, mounted respectively on axles 5, 6 and 7, the axle 6 having a crank 8 formed in its central portion, the usual side rods 9 for connecting the wheels, and main crank pins 10. The main crank pin 10 on wheel 4, on the left hand side of the locomotive, supports an eccentric crank 11 on the end of which is secured an eccentric crank pin 12 for operating the valve gear of the outside cylinder on the left hand side of the locomotive. The wheels 4 are driven by main rods 13 which are carried by the main crank pins 10. The wheel 4 on the right hand side of the locomotive carries, on its main crank pin 10, an eccentric crank 14 at the end of which is an eccentric crank pin 15 to which is secured another eccentric crank 16 at the end of which is an eccentric crank pin 17. The three crank pins are spaced from the axle 7 for traveling in circular paths, and are angularly disposed to provide for proper timing of the valves in the usual manner.

In the present embodiment, the outside cylinders 18 and 19 and the inside cylinder 20 are shown as high pressure cylinders, but it will be understood that this valve gear arrangement is not confined to use on such a locomotive but is adaptable for any three cylinder locomotive, such for instance as a compound locomotive.

Distribution valve chests 21 and 22 are disposed respectively above power cylinders 18 and 19 and a third distribution valve chest 23 is disposed at a side of the middle power cylinder 20. A cylinder saddle 24 is integrally formed, in the present embodiment, with the cylinders and the valve chests.

The distribution valve (not shown) in the chest 21, for operating the outside cylinder 18 on the right hand side of the locomotive, is connected by a valve stem 25 to a cross-head 26, which is bifurcated, each furcation 27 sliding in a crosshead guide 28. The crosshead 26 is pivotally connected to a combination lever 29 at an intermediate portion 30 thereof by a pin 31.

The upper end of the combination lever 29 is bifurcated for receiving an end of a radius bar 32 to which it is pivotally connected by a pin 33. The radius bar 32 extends to and is pivotally and slidably connected near its other end to a reversing link 34. The link 34 includes a slot 35 and on either side of the link and connected thereto at the top and bottom, but spaced therefrom throughout the intermediate portion, a check 36. The cheeks 36 each have a trunnion 37 at the center thereof, which pivotally connects the link to a bracket 38 which extends transversely of the locomotive. A link block 39 fits in the slot 35 in the link 34 for sliding therein.

The radius bar 32, at its end connected to the link 34, is bifurcated, a furcation 40 passing through the space 41 between each cheek and the adjacent side of the link 34, the link block 39 in the link slot 35 being thereby positioned between the furcations 40 of the radius bar 32 to which it is pivotally secured by a pin 42, this securing providing the pivotal and slidable connection of the radius bar 32 to the link 34.

The bifurcated end of the radius bar 32 extends beyond the link 34 and is connected to a reversing shaft 43 extending across the locomotive and mounted in bearings 44 carried by the bracket 38 on the top thereof. Each of the other valve gears has a radius bar substantially similar to the radius bar 32, and a link substantially similar to the link 34, except that the radius bar and link for the middle cylinder are disposed somewhat to the rear of those for the other two cylinders as will later more fully appear.

The shaft 43 is rigidly connected to two similar radius bar lifting arms 45 of the valve gears for the outside cylinders and to a radius bar lifting arm 46 of the valve gear for the middle cylinder. The radius bar lifting arm 45 at the right hand side of the locomotive is connected by a radius bar lifting link 47 to the bifurcated end of the radius bar 32 to which it is pivotally connected by a pin 48. The arm 45 at the left side of the locomotive is similarly connected to the radius bar at that side, it being understood that the gears for the two outside cylinders are similar in construction. The radius bar lifting arm 46 is part of the valve gear for the middle cylinder and is similarly connected by a link 47 to the radius bar thereof, this arm 46 being somewhat lengthened to compensate for the rearward positioning of the radius bar pin.

Extending upwardly from this arm 46 and rigidly connected thereto is a reverse shaft arm 49. As aforedescribed, the lifting arms 45 and 46 are rigidly secured to the reverse shaft 43 adapting them to be swung simultaneously with the turning of the shaft 43 by the reverse shaft arm 49 when operated in the usual manner, thereby insuring proper adjustment of each of the valve gears. The arm 49 may be moved mechanically or manually by either a power reverse gear or a reverse lever mechanism (not shown) pivotally connected to the end 51 of the arm 49.

Projecting downward and outward from the link 34 is a depending arm 52 which is formed as an extension of the cheek 36. A pin 53 pivotally connects the arm 52 to an eccentric rod 54, the opposite end of which is pivotally connected to the eccentric crank pin 17 thereby connecting the valve of the outside cylinder 18 with the driving wheel 4.

The bottom end of the combination lever 29 is pivotally connected by a pin 55 to a horizontal link 56, the other end of which is pivotally connected by a pin 57 to a crosshead 58 supporting the piston rod 59 of the piston in cylinder 18.

The valve gear for the cylinder 19 being similar to that for cylinder 18 as already mentioned, includes parts similar to those just referred to.

The valve stem 61 of the distribution valve for the middle cylinder is connected to a crosshead 62. A bracket 63, mounted on the outside of the side frame 1 adjacent thereto, includes a vertical plate 64 adapted for attachment to the side frame, a horizontal plate 65 and a reinforcing web 66 supporting the plate 65 on the plate 64. A bearing 67 is supported on one end of the plate 65, and spaced therefrom on the other end of the plate 65 is a second bearing 68 in alignment with the bearing 67.

A rocker shaft 69 is journalled in the bearings 67 and 68 and has a portion 70 which projects outward beyond the bearing 68. A rocker arm 71, having a hub 72, is mounted on this portion 70 and secured thereto by a key 73, and is further secured by a bolt 74 extending through the hub and engaging a transverse slot in the portion 70. Formed on the rocker arm 71 is a jaw 75 which is pivotally connected to a radius bar 76 by a pin 77.

The shaft 69 has a second portion 78 between the bearings 67 and 68. A hub 79, supported on the portion 78 of the shaft 69, is secured thereto by a key 80 and bolts 81 similar to the hub 72. Mounted on the hub 79 is a pair of upstanding arms 82, spaced to embrace an arm 87 of the middle valve gear, the upper ends of which form the lower halves of split bearings 83. Caps 84 are secured to the arms 82 by bolts 85 to form the upper halves of the split bearings 83.

A rocker shaft 86 is journalled in the bearings 83. It includes the relatively short depending bifurcated arm 87 disposed between the arms 82, providing a slot 88, the inner arm 82 being offset inwardly to provide sufficient space to accommodate the arm 87. The shaft 86 is extended from the inner arm 82 toward the middle cylinder providing a portion 89. The axis of the shaft 86 is in alignment with the axis of the pin 77 and is consequently swung through the same arc when the shaft 69 is rotated. The furcations of the arm 87 are orificed to receive a pin 90 pinned to the furcations. The pin 90 passes through an orifice in one end of a link 91 which is disposed in the slot 88 for pivotal movement of the link 91 about the pin 90. The link 91 at its other end is disposed in a slot in the crosshead 62 and pivotally connected thereto by a pin 92 for imparting movement thereto.

A depending arm 93 is provided with a hub 94 at its upper end which is secured upon the extended shaft portion 89 by means of a key 95 and a nut 96 secured on the end of said portion. The arm 93 is pivotally connected at its lower end to a combination link 97 by a pivot pin 98. The other end of the link 97 is pivotally connected by a pin 98' to an arm 99 depending from and rigid with a crosshead 100. The crosshead is connected by piston rod 101 to the piston (not shown) of the middle cylinder 20 and by a connecting rod 102 to the crank 8 in the usual manner, thereby giving the pin 98' the same traverse as that of the piston in the cylinder 20.

The arms 93, 87 and 71 combined serve as a combination lever for the valve gear for the middle cylinder 20. Thus there are three combination levers, one for each valve gear, which are constructed to provide uniformity in effective length of the corresponding arms of the respective combination levers. The combination levers for the outside cylinders are in the same transverse line and the combination lever for the middle cylinder is somewhat to the rear thereof, to compensate for the positioning of the link of the middle valve gear rearwardly of the links for the outside valve gears.

The radius bar 76, which is pivotally connected at its forward end to the top of the arm 71, and which is similar to the radius bar 32, is pivotally and slidably connected at its rear end portion to the link 103. This link, which is similar to link 34, is located at the inner side of the link 34 on the right side of the locomotive and somewhat to the rear of the link 34 as before remarked.

As is well known, these links oscillate at great speed depending upon the speed of the locomotive, making one complete oscillation for each complete revolution of the driving wheel to which they are connected. This produces great wear upon the journals and bearings supporting the links. Provision is made with comparative ease in the outside links to take care of this wear by proper proportioning of size of the supporting trunnions and bearings therefor. On account of the permissible maximum over-all transverse dimension of a locomotive, there is not ordinarily sufficient room provided by the locomotive frame and the outer link at the right side of the locomotive to permit a similar proportioned trunnion and bearing supporting the inner link if the three links are to be disposed in alignment. Therefore to provide suitable trunnion and bearing parts for the inner link this link, as previously stated, is disposed rearwardly of the adjacent link to a sufficient extent to dispose the inner link rearwardly of those of the adjacent link, the outer trunnion and bearing of the inner link as thus disposed being in the same vertical plane longitudinally of the locomotive as the adjacent trunnion and bearing of the adjacent link but entirely independent thereof. This construction, as is obvious, provides considerable extra space transversely of the locomotive for the inner link so that trunnions and bearings may be provided therefor similar to those of the other two links and will be capable of resisting the severe wear to which they are subjected to the same degree as are those of the other two links.

An eccentric rod 104 is pivotally conected at its forward end by a pin 53' to an arm 105 depending downwardly and outwardly from the outer cheek of link 103. The rear end of the eccentric rod 104 is pivotally connected to the eccentric crank pin 15. The rod 104 operates in a plane to the inside of the rod 54.

The bracket 38, briefly described, comprises a horizontal plate 106 secured to the side frames 1 of the locomotive and a forwardly disposed vertical plate 107. The plate 107 is provided with openings which are sufficiently large to permit the respective radius bars to extend therethrough and to move vertically therein. The horizontal plate 106 is provided with vertical openings 108 through which the links extend, bearings 109 being provided at each side of the openings for the trunnions 37.

It will be noted that the two openings 108 at the right side of the locomotive provide a partition wall or bridge 110 of sufficient width to provide adjacent trunnions and bearings of suitable size as before mentioned for the two adjacent links. It will be further noted that the link and radius bar on the left side of the locomotive are in line with the crosshead of the valve stem while the eccentric rod at this side is outwardly offset relative to the link to bring it in line with the pin 12 to which it is pivotally connected at its rear end which pin is necessarily outwardly out of line with the crosshead of the valve stem on account of the position of the main rod 13 for the cylinder 19. Similarly on account of the link for the valve gear for the cylinder 18 being disposed at an extreme laterally outward position to provide sufficient room for the adjacent link, the radius bar 32 for this outer valve gear is offset inwardly relative to the link to provide alignment thereof with its crosshead 26. Likewise the radius bar 76 is offset inwardly from its link to provide alignment with its arm 71 which is necessarily disposed inwardly of the crosshead 26 to prevent interference therewith.

The arm 105 due to the inward position of the link 103 is offset outwardly and the eccentric rod 104 is likewise offset outwardly to provide alignment thereof with its pin 15, and the arm 52 is offset outwardly to escape the arm 105, and the eccentric rod 54 is offset inwardly to provide alignment with its pin 17. The arms 52 and 105 are not completely shown in Fig. 3 to prevent confusion of the drawings.

As was previously noted, the arm 46 is longer than the arm 45, and consequently as the shaft 43 revolves, the link block 39 of the link 103 will rise and fall through a slightly greater arc than the link block in the link 34, which would prevent similar adjustment of the respective valves. This is compensated for within necessary limits by making the throw of the eccentric crank pin 15 slightly less than the throw of the eccentric crank pin 17, so that the angular swing of the link 103 is slightly less than that of link 34. The result of this difference in link swing is that although the link block in the link 103 may be further from the center of swing, its distance of traverse corresponds with the link block in the link 34 which is nearer the center of swing but travels a greater arc. Thus substantially uniform travel for all valves is obtained, the throw of the eccentric crank pin 12 being the same as the throw of the eccentric crank pin 17.

The valve gears for the outside cylinders being substantially similar, a detailed description of the valve gear on the right hand side of the locomotive only has been given. These valve gears operate in the well-known way of the Walschaert valve gear, and no further description thereof is deemed necessary.

The valve gear for the middle cylinder is entirely independent of the valve gears for the other two cylinders. The reversal and adjustment of the middle cylinder is provided for through its link 103 and its associated parts simultaneously with and in substantially the same manner as, adjustment and reversal of the other two valves.

The lap and lead and travel of the middle valve is effected by the movement of the crosshead of the piston of the middle cylinder and the eccentric rod of the middle gear which oscillates the link of this gear. The movement of the valve is the result of the combined movements of the crosshead and link. The valve is connected through its valve stem 61, its crosshead 62 and the link 91, to the arm 87 carried by shaft 86. The crosshead 100 is connected to this shaft through link 97 and arm 93 whereby the shaft is rocked and the valve stem moved responsive thereto as the crosshead 100 reciprocates. The shaft 86 is pivotally mounted in the arms 82 which are carried by shaft 69. This shaft 69 is rocked and the valve stem moved responsive thereto as the link oscillates. The shaft 69, the two arms 82 and arm 71 afford a rockable support for the upper end of arm 93, arm 87 and the forward end of radius bar 76 and further provide a simple construction whereby these members may be spaced transversely from each other for transmitting movement from the centrally disposed crosshead 100 and the eccentric pin 15 on drive wheel 4 on the right side of the locomotive to the valve of the middle cylinder which is disposed laterally intermediate the crosshead of the middle cylinder and the pin 15.

It will further be noted that the valve of the middle cylinder receives its lap and lead movement from the arm 87 which is rigid with the shaft 86 through the link 91 which is pivotally connected to the free end of the arm. Therefore the lap and lead movement is not dependent upon the movement of the shaft 69. The frictional wear caused by the lap and lead movement is therefore taken entirely by the shaft 86 leaving the shaft 69 for taking the entire frictional wear created by the valve travel produced by the link, the radius bar having the capacity for rocking the shaft 69 independently of the rocking of the shaft 86. The friction therefore, on journals and bearings, is distributed between these two shafts.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. In valve gear for two cylinders of a locomotive, a bracket having two vertical openings spaced from each other by a bridge, said bracket having means disposed inwardly of said openings for securing it to the main frame of said locomotive whereby said openings and said bridge will be disposed in a direction longitudinally of said locomotive and laterally outward beyond the same side of said main frame, said bracket being provided with a pair of bearings having the axis thereof crossing one of said openings in a direction transversely thereof and having one of its bearings extending across said bridge and its other bearing disposed in said bracket at the opposite side of said one of said openings, a reversing link extending in a vertical direction through said opening between said bearings and having trunnions mounted in said bearings, another pair of bearings, spaced in a longitudinal direction from said first mentioned pair of bearings, having the axis thereof crossing the other of said openings in a direction transversely thereof and having one of its bearings extending across said bridge and its other bearing disposed in said bracket on the opposite side of said other of said openings, and another reversing link extending in a vertical direction through said other of said openings and having trunnions mounted in said last mentioned pair of bearings.

2. A locomotive having a main frame, a main driving wheel, a pair of power cylinders and a distribution valve for each of said cylinders, each of said valves having a valve stem; a bracket having two vertical openings extending longitudinally of said locomotive, spaced from each other by a bridge extending longitudinally of said locomotive, said bracket being secured inwardly of said openings to said main frame, said openings being disposed laterally outward beyond the same side of said main frame, said bracket being provided with a pair of bearings having the axis thereof crossing one of said openings in a direction transversely thereof and having one of its bearings extending across said bridge and its other bearing disposed in said bracket at the opposite side of said one of said openings; a reversing link extending in a vertical direction through said opening between said bearings and having trunnions mounted in said bearings, said trunnions of said link permitting oscillation thereof, said bracket being provided with another pair of bearings, spaced in a longitudinal direction from said first mentioned pair of bearings, having the axis thereof crossing the other of said openings in a direction transversely thereof and having one of its bearings extending across said bridge and its other bearing disposed in said bracket on the opposite side of said other of said openings; another reversing link extending in a vertical direction through said other of said openings and having trunnions mounted in said last mentioned pair of bearings, said trunnions of said other link permitting oscillation thereof; two separate sets of valve gear parts disposed between said links and said valve stems, one of said sets being connected to one of said valve stems and comprising a radius bar and a block pivotally connected thereto slidably disposed for adjustment in one of said links, and the other of said sets being connected to the other of said valve stems and comprising a radius bar and a block pivotally connected thereto slidably disposed for adjustment in the other of said links, said two sets being adapted to equally reciprocate their respective valve stems during equal oscillations of their respective blocks; and means for simultaneously adjusting said blocks and for oscillating said links whereby said blocks will be oscillated in substantially equal arcs for any adjustment, comprising a shaft adapted to be rotated, means rigidly secured to said shaft and pivotally connected to each of said radius bars, an eccentric crank secured to said wheel, an eccentric rod pivotally connecting said crank to one of said links, another eccentric crank secured to said wheel, and another eccentric rod pivotally connecting said other eccentric crank to the other of said links.

3. A locomotive having a main frame, a main driving wheel, a pair of power cylinders and a distribution valve for each of said cylinders, each of said valves having a valve stem; a bracket having two vertical openings extending longitudinally of said locomotive, spaced from each other by a bridge extending longitudinally of said locomotive, said bracket being secured inwardly of said openings to said main frame, said openings being disposed laterally outward beyond the same side of said main frame, said bracket being provided with a pair of bearings having the axis thereof crossing one of said openings in a direction transversely thereof and having one of its bearings extending across said bridge and its other bearing disposed in said bracket at the opposite side of said one of said openings; a reversing link extending in a vertical direction through said opening between said bearings and having trunnions mounted in said bearings said trunnions of said link permitting oscillation thereof, said bracket being provided with another pair of bearings, spaced in a longitudinal direction from said first mentioned pair of bearings, having the axis thereof crossing the other of said openings in a direction transversely thereof and having one of its bearings extending across said bridge and its other bearing disposed in said bracket on the opposite side of said other of said openings; another reversing link extending in a vertical direction through said other of said openings and having trunnions mounted in said last mentioned pair of bearings, said trunnions of said other link permitting oscillation thereof; two separate sets of valve gear parts disposed between said links and said valve stems, one of said sets being connected to one of said valve stems and comprising a radius bar and a block pivotally connected thereto slidably disposed for adjustment in one of said links, and the other of said sets being connected to the other of said valve stems and comprising a radius bar and a block pivotally connected thereto slidably disposed for adjustment in the other of said links, said two sets being adapted to equally reciprocate their respective valve stems during equal oscillations of their respective blocks; means for simultaneously adjusting said blocks whereby said blocks are moved unequal distances from their respective trunnions, comprising a shaft adapted to be rotated, and means rigidly secured to said shaft and pivotally connected to each of said radius bars; and means for oscillating said links, comprising an eccentric crank secured to said wheel, an eccentric rod pivotally connecting said crank to one of said links, another eccentric crank secured to said wheel, and another eccentric rod pivotally connecting said other eccentric crank to the other of said links, said eccentric cranks being of different lengths to compensate for said unequal adjustments of said blocks, to thereby effect substantially equal movements of said valves.

4. A valve gear for a distribution valve of a locomotive comprising a mounting adapted to be connected to the framework of said locomotive; a rocker carried by said mounting adapted to be rocked about the axis thereof; a second mounting carried by said rocker having its axis spaced radially from said axis of said first mentioned mounting; a second rocker carried by said second mounting to move bodily with the rocking of said first mentioned rocker and adapted to be rocked about said axis of said second mounting; a combination link operatively connected to said second rocker having the capacity for rocking same independently of the rocking of said first mentioned rocker; a radius bar operatively connected to said first mentioned rocker having the capacity for rocking same independently of the rocking of said second rocker; and means adapted for connection with the stem of said distribution valve having connection with said second rocker for moving said valve when either of said rockers rock.

5. A valve gear for a distribution valve of a locomotive comprising a mounting adapted to be connected to the framework of said locomotive; a rocker carried by said mounting adapted to be rocked about the axis thereof; a second mounting carried by said rocker having its axis spaced radially from said axis of said first mentioned mounting; a second rocker carried by said second mounting to move bodily with the rocking of said first mentioned rocker and adapted to be rocked about said axis of said second mounting; a combination link operatively connected to said second rocker having the capacity for rocking same independently of the rocking of said first mentioned rocker; a radius bar operatively connected to said first mentioned rocker having the capacity for rocking same independently of the rocking of said second rocker; and means adapted for connection with the stem of said distribution valve having pivotal connection with said second rocker, the axis of said pivotal connection being spaced from the axis of said second mounting whereby said valve will be moved when either of said rockers rock.

EVERETT W. BLANCHARD.